United States Patent

[11] 3,545,400

| [72] | Inventor | Von L. Smith |
| | | 2632 Barbera Way, Rancho Cordova, California 95670 |
| [21] | Appl. No. | 810,262 |
| [22] | Filed | March 25, 1969 |
| [45] | Patented | Dec. 8, 1970 |

[54] FREEZE AND THAW INDICATOR
1 Claim, 2 Drawing Figs.

[52] U.S. Cl.................................................. 116/114.5,
99/192, 116/114
[51] Int. Cl................................................. G01k 1/02
[50] Field of Search........................................ 116/114,
101, 114.5, 114.20, 106; 99/192(TT)

[56] References Cited
UNITED STATES PATENTS

| 2,753,270 | 7/1956 | Renzo | 99/192 |
| 2,850,393 | 9/1958 | Romito | 99/192 |
| 2,971,852 | 2/1961 | Schulein | 99/192 |
| 3,177,843 | 4/1965 | Geocaris | 116/114.5 |
| 3,243,303 | 3/1966 | Johnson | 99/192 |
| 3,055,759 | 9/1962 | Busby et al. | 99/192 |

Primary Examiner—Louis J. Capozi
Attorneys—Harry A. Herbert, Jr. and Jacob N. Erlich ABSTRACT: A freeze and thaw indicator having a base portion which is affixed to an article to be frozen and an indicating means mounted on the base portion. The indicating means being a container filled with liquid and an absorbent pad adjacent thereto. Freezing of the container expands the liquid therein, rupturing the container. When thawing occurs the liquid in the container flows onto the absorbent pad providing a positive indication thawing took place.

PATENTED DEC 8 1970

3,545,400

INVENTOR.
VON L. SMITH
BY Harry A. Herbert Jr
Jacob N. Erlich and
ATTORNEYS

FREEZE AND THAW INDICATOR

BACKGROUND OF THE INVENTION

This invention relates generally to indicators and, more particularly, to an indicator for permanently recording the change of temperature of an article from the freezing to the thawing state.

All foods are subject to spoilage and the extent of spoilage will depend upon a number of factors, such as the number and kind of microorganisms present, the number and kind of enzymes present, and whether the food has been pretreated to inhibit the effects of microbiological and enzymatic spoilage. Various environmental factors such as temperature and humidity at which foods are stored, as well as the particular nature of the food itself, that is its composition, structure and moisture content also present problems when attempting to preserve processed and unprocessed food products from spoilage. A food that is thought fit to eat by one person may be quite unattractive to another. In general, fitness of food is determined by its state of development or maturity, absence of contamination in processing, and presence or absence of microbiological or enzymatic action. Causes of spoilage may be microorganisms, insects and other pests, enzyme activity, natural metabollic reactions, and environmental effects such as freezing, burning, drying, etc.

Food spoilage may be considered any change in the natural state of the food that lessens its desirability, either for aesthetic or health reasons. In general, these changes are of a biological nature, brought about by the growth of microorganisms or are autolytic changes brought about by enzymes produced within the tissue itself.

Refrigeration is a reliable method of preservation, but it is more effective at temperatures below freezing than above. In common useage, the term "refrigerated foods" designates those preserved at temperatures which are above freezing, and frozen foods, those preserved at lower temperatures. Most spoilage bacteria grow very slowly at temperatures below 7.2° C. and some do not grow at all. A satisfactory refrigerator should therefore be kept below this temperature, the closer to 0° C. the better. At best, foods cannot be preserved in the refrigerator more than one or two weeks because of this bacteriological growth.

Frozen foods may be kept for long periods of time. Although the bacteria are not killed by the freezing, they remain dormant in the frozen state unless the temperature is quite close to the freezing point. Enzymes that have been elaborated by bacteria or that are present in the food can function slowly.

If for some reason the food should become thawed, that is, the temperature rises above the freezing level, the bacteria will become extremely active and grow at a rapid rate. Refreezing such food merely slows the rate of the already multiplied bacteria. Thus, the later consumption of such thawed food which has already been once thawed causes many of the undesirable effects set forth hereinabove.

It has been heretofore a major problem to determine if such frozen food has ever been thawed and then refrozen. Furthermore, the harmful effects set forth above not only pertain in food but they also are involved in use of frozen and thawed drugs and blood. Clothing, articles, and other equipment needed to be kept frozen to retain certain characteristics must also have some sort of indicating means attached thereto. It is therefore clearly evident that a large need exists for such an indicating means.

SUMMARY OF THE INVENTION

The instant invention overcomes the problems heretofore encountered and as set forth above. The invention set forth hereinbelow, is an indicator which will permanently record the change of temperature of an article from the frozen to the unfrozen state.

The indicator of this invention utilizes water or a suitable substitute which is enclosed in a sealed container. The indicator is then affixed to the article or a package containing the article which is to be frozen. When the article or the contents of the package freezes the liquid in the container of the indicator also freezes. The increased volumetric expansion of the liquid in the container causes a seal of the container to rupture. No further action takes place until the frozen article thaws. Upon thawing, that is when the temperature reaches 0° C., the expanded frozen liquid of the container reverts to its original liquid form and flows from the container onto an absorbing indicating pad. This is a nonreversible action that provides a positive indication that the frozen article or contents of a package has been thawed. If for any reason the article is refrozen, the permanent recording of the original thawing still remains.

It is therefore an object of this invention to provide an indicator which is easily affixed to an article and which is capable of permanently recording the change of temperature of an article from freezing to thawing.

It is another object of this invention to provide an indicator which utilizes conventional, currently available components that lend themselves to standard mass producing manufacturing techniques.

For a better understanding of the present invention, together with other and further objects thereof, reference is made to the following description taken in connection with the accompanying drawing and its scope will be pointed out in the appended claims.

DESCRIPTION OF THE PREFERRED EMBODIMENT

Figure 1:
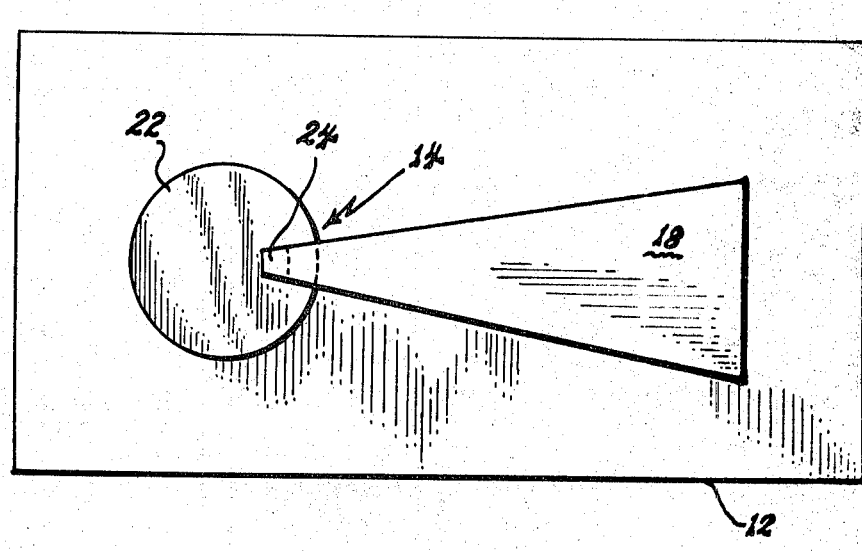
FIG. 1 is a top view of the freeze and thaw indicator of this invention.
Figure 2:
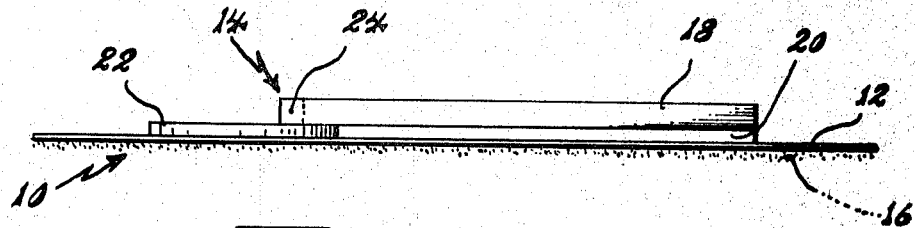
FIG. 2 is a side elevation of the freeze and thaw indicator of this invention.

Reference is now made to FIGS. 1 and 2 of the drawing wherein the freeze and thaw indicator of this invention is represented by numeral 10. A base portion 12 made of any suitable material such as plastic supports the indicating means 14 of indicator 10. The base portion 12 is in turn affixed by any suitable adhesive 16 to the article or package (not shown) to be frozen.

A container 18 made of any suitable material such as plastic is secured to a support 20 and an indicator pad 22, all which form indicating means 14. The support 20 and indicator pad 22 are securely mounted by any suitable securing means to the base portion 12. The container 18 is filled with water or any other suitable substitute which will freeze at a predetermined temperature, preferably the temperature at which the article upon which the indicator 10 is to be affixed will freeze. The container 18 is sealed by any suitable sealing means 24 which can be easily ruptured. The indicator pad 22 is made of any conventional absorbent material which will change color upon coming in contact with the liquid within container 18. For example, the indicator pad 22 may be of a light color and the liquid within container 18 may be of a dark color. The color of the liquid changing the color of the pad 22 upon contact therewith.

MODE OF OPERATION

Water or a suitable substitute is filled into the container 18 which is sealed with a suitable sealing means 24. The indicator 10 is then affixed to the article or package to be frozen. When the article or contents of the package freezes, the liquid within container 18 also freezes. The increased volumetric expansion of the liquid within container 18 causes the seal 24 to rupture. No further action takes place until the package thaws. At that time, the liquid within the container 18 reverts to its original form and flows from the container onto the absorbent pad 22. The pad will then change color in a nonreversible action that provides a positive indication that the frozen article has thawed.

Although the invention has been described with reference to a particular embodiment, it will be understood to those skilled in the art that the invention of a variety of alternative embodiments within the spirit and scope of the appended claims.

I claim:

1. A freeze and thaw indicator comprising a base portion, said base portion having an adhesive on the bottom thereof, an absorbent indicator pad mounted on the upper side of said base portion, a container having a liquid therein mounted adjacent said indicator pad, said container having a rupturable seal at one end thereof, said rupturable seal located directly above said indicator pad, said indicator pad being of a light color and said liquid being of a dark color whereby said liquid in its frozen state ruptures said seal and thereafter in its liquid state changes the color of said indicator pad upon contact therewith.